United States Patent Office 3,415,818
Patented Dec. 10, 1968

3,415,818
DIOXIMIDOANDROSTANES AND CYCLIZED
N-OXIDES DERIVED THEREFROM
Robert G. Christiansen, Schodack, N.Y., assignor to
Sterling Drug Inc., New York, N.Y., a corporation of Delaware
No Drawing. Filed July 8, 1965, Ser. No. 470,570
9 Claims. (Cl. 260—239.55)

ABSTRACT OF THE DISCLOSURE

The invention pertains to dioximidoandrostanes and cyclized N-oxides derived therefrom, having pituitary inhibiting activity, estrogenic activity, androgenic activity and anabolic activity.

This invention relates to new steroids of the androstane series, and more particularly relates to dioximidoandrostanes and to cyclized products derived therefrom.

One aspect of the invention relates to compounds of the formula

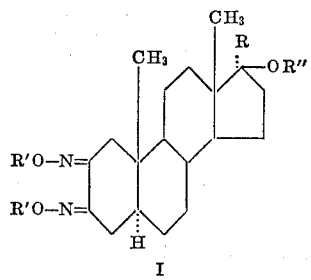

I wherein R is hydrogen or lower-alkyl, and R' and R" are hydrogen or carboxylic acyl having up to (and thus including) twelve carbon atoms.

When R in the above Formula I is lower-alkyl it stands for an alkyl group having from one to four carbon atoms, thus including methyl, ethyl, propyl, isopropyl, butyl and the like.

The term "carboxylic acyl having up to (and therefore including) twelve carbon atoms" refers to acyl radicals derived from carboxylic acids having up to (and therefore including) twelve carbon atoms and a molecular weight less than about 250. Representative of the lower-carboxylic acyl radicals which can be present are lower-alkanoyl, e.g., acetyl, propionyl, isobutyryl, caproyl, heptanoyl, octanoyl, dodecanoyl, trimethylacetyl, and the like; cycloalkyl-lower-alkanoyl wherein cycloalkyl has 5–6 ring members, e.g., β-cyclopentylpropionyl, β-cyclohexylpropionyl, and the like; benzoyl; phenyl-lower-alkanoyl or -alkenoyl, e.g., phenylacetyl, β-phenylpropionyl, cinnamoyl, and the like; phenoxy-lower-alkanoyl, e.g., p-chlorophenoylacetyl; and pyridylcarbonyl, e.g., nicotinoyl and isonicotinoyl. In acyl radicals containing a phenyl group, the benzene ring thereof can be unsubstituted or substituted by any number and kind of substituents inert under the reaction conditions used, including lower-alkyl, for example p-tolyl; lower-alkoxy, for example 3,4-dimethoxyphenyl; halogen (including fluorine, chlorine, bromine and iodine), for example 2-bromophenyl; and nitro, for example p-nitrophenyl. The lower-alkyl and lower-alkoxy groups can have from one to four carbon atoms.

The compounds of Formula I wherein R' is hydrogen are prepared by reacting a 17α-R-17β-OR"-5α-androstane-2,3-dione with hydroxylamine. Alternatively, the compounds of Formula I can be prepared stepwise from a 17α-R-17β-OR"-5α-androstan-3-one, first by treating the latter with a lower-alkyl nitrite in the presence of a basic catalyst to introduce an oximido group in the 2-position, and then treating the product with hydroxylamine to convert the 3-oxo group to an oximido group.

The compounds wherein R' and/or R" are carboxylic acyl are prepared by conventional esterification reactions. The 17β-oxy group can be esterified prior to oxime formation in which case it is possible to prepare compounds where R' and R" are different acyl groups.

A further aspect of the invention relates to compounds of the formula

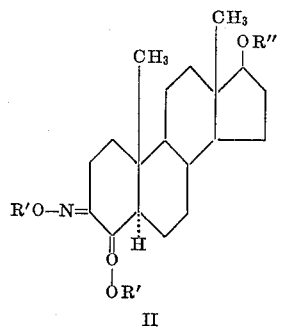

II wherein R' and R" are hydrogen or carboxylic acyl having up to (and thus including) twelve carbon atoms.

The compounds of Formula II wherein R' is hydrogen are prepared by reacting 4-hydroxytestosterone or a 17-ester thereof with hydroxylamine. The compounds of Formula II wherein R' and/or R" are carboxylic acyl are prepared by conventional esterification reactions. In the event the 17β-oxy group is esterified prior to oxime formation it is possible to prepare compounds where R' and R" are different acyl groups.

A further aspect of the invention relates to N-oxides of compounds of the formula

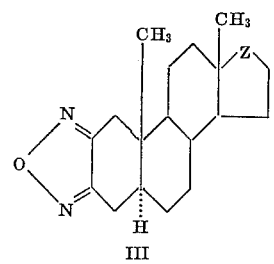

III wherein Z is CH(β - OH), CH(β - OH) - lower - alkyl, CH(β-OAcyl), C(β-OAcyl)-lower-alkyl or C=O, acyl being carboxylic acyl having up to (and thus including) twelve carbon atoms. The lower-alkyl groups can have from one to four carbon atoms.

The N-oxides of the compounds of Formula III are prepared by treating a compound of Formula I with a source of positive halogen, such as N-halogenated amides or imides, for example, N-bromoacetamide, N-bromosuccinimide, N-bromophthalimide, and the like; or inorganic hypochlorites, for example, sodium hypochlorite or potassium hypobromite. The reaction takes place readily at room temperature. In the event that a secondary hydroxy group is present at the 17-position, it may be oxidized during the cyclization reaction to an oxo group, thus producing the N-oxide of the compound of Formula III where Z is C=O. The oxidation at C-17 can be prevented by protecting the 17-hydroxy group as an ester prior to cyclization.

The structures of the compounds of the invention were established by the mode of preparation, by elementary analyses and by ultraviolet and infrared spectra.

Endocrinological evaluation of compounds of Formulas I and II has shown that they possess hormonal properties, including pituitary inhibiting activity, estrogenic activity, androgenic activity and anabolic activity. Effective dose levels range from 1 to 50 mg./kg., and the compounds can be formulated and administered to animal organisms in the same manner as other steroidal hormones.

The N-oxides of the compounds of Formula III are useful as intermediates in the preparation of the compounds of Formula III themselves which are known to be useful as anabolic agents. The conversion of the N-oxides to the free amines is carried out by methods known to reduce N-oxides [cf. C. C. J. Culvenor, Rev. Pure and Appl. Chem. (Australia), 3, 99–103 (1953)], for example by catalytic hydrogenation or by treatment with agents such as phosphorus pentachloride, phosphorus tribromide, phosphorus trichloride, zinc in basic medium, stannous chloride, sodium amalgam and the like.

The following examples will further illustrate the invention without the latter being limited thereby.

EXAMPLE 1.—2,3-dioximido-17α-methyl-5α-androstan-17β-ol [I; R is $CH_3$, R' and R" are H]

A mixture of 3.18 g. of 17α-methyl-5α-androstan-17β-ol-2,3-dione, 2.78 g. of hydroxylamine hydrochloride, 20 ml. of pyridine and 20 ml. of ethanol was refluxed for three hours. The solvent was removed by distillation, the residue stirred with 400 ml. of water, and the solid product collected by filtration and dried to give 3.29 g. of product, M.P. 247° C. (dec.). The latter was recrystallized twice from ethanol to give 2,3-dioximido-17α-methyl-5α-androstan-17β-ol. M.P. 267.2–271.6° C. (corr.), $$[\alpha]_D^{25} = +61.0° \pm 0.2°$$

(1% in pyridine); ultraviolet maximum at 239 mμ

$$(\epsilon = 6800)$$

infrared absorption at 3.05, 3.45 and 6.15μ.

2,3-dioximido-17α-methyl-5α-androstan-17β-ol showed evidence of pituitary inhibiting activity when administered to female rats at a dose level of 10.0 mg./kg.

2,3-dioximido-17α-methyl-5α-androstan - 17β-ol when treated with acetic anhydride in pyridine at room temperature affords 2,3-dioximido-17α-methyl-5α-androstan-17β-ol 2,3-diacetate [I; R is $CH_3$, R' is $CH_3CO$, R" is H]. With the same reagents heated at reflux temperature there is produced 2,3-dioximido-17α-methyl-5α-androstan-17β-ol triacetate [I; R is $CH_3$, R' is $CH_3CO$, R" is $OCCH_3$]. Similarly, by employing other acid anhydrides or acid halides, for example, propionic anhydride, caproyl chloride, dodecanoyl chloride, β-cyclohexylpropionyl chloride, benzoyl chloride, p-nitrobenzoyl chloride, phenylacetyl chloride, cinnamoyl chloride, p-chlorophenoxyacetyl chloride or nicotinoyl chloride, there can be obtained, respectively, the di- or tripropionate, di- or tricaproate, di- or tridodecanoate, di- or tri(β-cyclohexylpropionate), di- or tribenzoate, di- or tri-(p-nitrobenzoate), di- or tri-(phenylacetate), di- or tricinnamate, di- or tri-(p-chlorophenoxyacetate), or di- or trinicotinate of 2,3-dioximido-17α-methyl-5α-androstan-17β-ol.

EXAMPLE 2.—(a) 2-oximido-5α-androstan-17β-ol-3-one

A solution of 11.00 g. of androstan-17β-ol-3-one in 100 ml. of tetrahydrofuran was added to a solution of potassium tertiary-butoxide (prepared from 1.95 g. of potassium and 100 ml. of tertiary-butyl alcohol) at room temperature under a nitrogen atmosphere. A solution of 3.90 g. of n-butyl nitrite in 10 ml. of tetrahydrofuran was then added and the reaction mixture allowed to stand overnight. The reaction mixture was diluted with 1000 ml. of water, acidified with dilute hydrochloric acid, and the solid product collected by filtration and recrystallized twice from methanol to give 2-oximido-5α-androstan-17β-ol-3-one, colorless needles, M.P. 283° C. (corr., dec.), $[\alpha]_D^{25} = +50.3°$ (1% in pyridine).

(b) 2,3-dioximido-5α-androstan-17β-ol [I; R, R' and R" are H] was prepared from 2-oximido-5α-androstan-17β-ol-3-one and hydroxylamine hydrochloride in ethanol-pyridine solution according to the procedure described above in Example 1. There was obtained 15.0 g. of 2,3-dioximido-5α-androstan-17β-ol, M.P. 279–280° C. (uncorr., dec.), ultraviolet maximum at 239 mμ

$$(\epsilon = 5700)$$

infrared absorption at 3.13, 3.46, 5.80, 6.02 and 6.87μ.

EXAMPLE 3.—2,3-dioximido-5α-androstan-17β-ol triacetate [I; R is H, R' is $CH_3CO$, R" is $COCH_3$]

A mixture of 3.35 g. of 2,3-dioximido-5α-androstan-17β-ol (Example 2), 10 ml. of acetic anhydride and 20 ml. of pyridine was heated for two hours on a steam bath and then poured into 1 liter of water. The solid product was collected by filtration, dissolved in 225 ml. of methylene dichloride and 25 ml. of tetrahydrofuran and chromatographed on 100 g. of silica gel. The column was eluted with the same solvent mixture and the product recrystallized from methanol to give 2,3-dioximido-5α-androstan-17β-ol triacetate, M.P. 157.6–159.0° C. (corr.), $[\alpha]_D^{25} = +44.4°$ (1% in methanol).

EXAMPLE 4

2,3-dioximido-5α-androstan-17β-ol 17-acetate [I; R is H, R' is H, R" is $COCH_3$] can be prepared from 17β-acetoxy-5α-androstane-2,3-dione and hydroxylamine by the procedure of Example 1.

EXAMPLE 5.—3,4-dioximido-5α-androstan-17β-ol [II; R' and R" are H]

A mixture of 8.07 g. of 4,17β-dihydroxy-4-androsten-3-one, 6.95 g. of hydroxylamine hydrochloride, 50 ml. of pyridine and 50 ml. of ethanol was refluxed for four hours. The solvent was then removed by distillation at reduced pressure, water was added to the residue and the mixture allowed to stand for five days. The product was collected by filtration and recrystallized three times from methanol to give 3,4-dioximido-5α-androstan-17β-ol, M.P. 253.4–255.8° C. (corr., dec.), $[\alpha]_D^{24} = -10.8°$ (1% in pyridine); ultraviolet maxima at 225 and 250 mμ ($\epsilon = 5300, 4300$); infrared absorption at 2.9, 3.12, 3.43, 6.23, 6.46, 6.80, 6.92 and 7.02 μ.

3.4-dioximido-5α-androstan-17β-ol was found to be stimulatory as an estrogen in effecting uterine growth in rats at a dose level of 2.5 mg./kg.; showed evidence of pituitary inhibiting activity when administered to female rats at a dose level of 10 mg./kg.; was active as an anabolic agent (nitrogen retention) when administered orally to rats at a dose level of 1.0 mg./rat/day; and was found active as a myotrophic agent when administered subcutaneously to rats at a dose level of 0.7 mg./kg.

3.4-dioximido-5α-androstan-17β-ol when treated with acetic anhydride in pyridine, is converted to its triacetate [II; R' and R" are $COCH_3$].

By replacing the 4,17β-dihydroxy-4-androsten-3-one in the foregoing preparation by a molar equivalent amount of 17β - acetoxy-4-hydroxy-4-androsten-3 - one, there can be obtained 3,4-dioximido-5α-androstan-17β-ol 17-acetate [II; R' is H, R" is $COCH_3$]. The latter can be esterfied with benzoyl chloride in pyridine to give 3,4-dioximido-5α-androstan-17β-ol 17-acetate 3,4-dibenzoate [II; R' is $COC_6H_5$, R" is $COCH_3$].

Example 6.—17β - hydroxy-17α-methyl - 5α - androstano [1,3-c]-1,2,5-oxadiazole N-oxide [N-oxide of III; Z is $C(\beta-OH)CH_3$]

To a solution of 3.97 g. of 2,3-dioximido-17α-methyl-5α-androstan-17β-ol (Example 1) in 35 ml. of pyridine was added 4.02 g. of N-bromoacetamide and 15 ml. of pyridine. The reaction mixture was allowed to stand at room temperature for three days and then diluted with 1 liter of water. The solid product was collected by filtration, washed with water, dried at 80° C. in vacuo, dissolved in methylene dichloride and chromatographed on 200 g. of Florisil (activated magnesium silicate). The chromatograph column was eluted with ether-pentane 1:3 and the product recrystallized twice from methanol to give 17β-hydroxy-17α-methyl-5α-androstano[2,3-c]-1,2,5-oxadiazole N-oxide, platelets, M.P. 173.8–179.8° C. (corr.); [α]$_D^{25}$=+42.0° (1% in chloroform); ultraviolet maximum at 262 mμ (ε=6790).

17β-hydroxy - 17α - methyl-5α-androstano[2,3-c]-1,2,5-oxadiazole N-oxide when heated at reflux temperature with acetic anhydride in pyridine is converted to 17β-acetoxy - 17α-methyl-5α-androstano[2,3-c]-1,2,5 - oxadiazole N-oxide [N-oxide of III; Z is C(β-OCOCH$_3$)CH$_3$].

17β-hydroxy - 17α - methyl-5α-androstano[2,3-c]-1,2,5-oxadiazole N-oxide when heated with phosphorus pentachloride can be converted to 17β-hydroxy-17α-methyl-5α-androsano[2,3-c]-1,2,5-oxadiazole which has anabolic activity.

Example 7.—17 oxo-5α-androstano[2,3-c]-1,2,5-oxadiazole N-oxide [N-oxide of III; Z is C=O]

To a solution 35.5 g. of 2,3-dioximido-5α-androstan-17β-ol (Example 2) in 400 ml. of pyridine was added 61.0 g. of N-bromoacetamide. The reaction mixture was stirred to dissolve the N-bromoacetamide and allowed to stand for three days at room temperature. The reaction mixture was then poured into ice-water containing 425 ml. of 12 N hydrochloric acid and extracted with methylene dichloride. The extracts were washed with water, dried over anhydrous magnesium sulfate and concentrated to dryness. The residue was recrystallized from methyl ethyl ketone and from acetonitrile to give 17-oxo-5α-androstano[2,3-c]-1,2,5-oxadiazole N-oxide, colorless rods, M.P. 236.6–238.2° C., [α]$_D^{25}$=+136.3° (1% in chloroform); ultra-violet maximum at 262 mμ (ε=7190); infrared absorption at 2.95, 3.45, 5.78, 6.18 and 6.82μ.

By replacing the 2,3-dioximido-5α-androstan-17β-ol in the foregoing preparation by a molar equivalent amount of 2,3-dioximido-5α-androstan-17β-ol 17-acetate, there can be obtained 17β-acetoxy-5α-androstano[2,3-c]-1,2,5-oxadiazole N-oxide [N-oxide of III; Z is CH(β-OCOCH$_3$)], which can be hydrolyzed with potassium carbonate in methanol solution to afford 17β-hydroxy-5α-androstano[2,3-c]-1,2,5-oxadiazole N-oxide [N-oxide or III; Z is CH(β-OH)]. The latter alternatively can be prepared by reduction of 17-oxo-5α-androstano[2,3-c]-1,2,-5-oxadiazole N-oxide with lithium aluminum hydride or potassium borohydride. 17β-hydroxy-5α-androstrano[2,3-c]-1,2,5-oxadiazole N-oxide can be converted by heating with phosphorus pentachloride to 17β-hydroxy-5α-androstano[2,3-c]-1,2,5-oxadiazole which has anabolic activity.

17β - hydroxy-5α-androstano[2,3-c]-1,2,5 - oxadiazole N-oxide can be esterified by treating it in pyridine solution with propionic anhydride, caproyl chloride, dodecanoyl chloride, β-cyclohexylpropionyl chloride, benzoyl chloride, p-nitrobenzoyl chloride, phenylacetyl chloride, cinnamoyl chloride, p-chlorophenoxyacetyl chloride or nicotinoyl chloride, to give respectively, the 17β-propionate, 17β-caproate, 17β-dodecanoate, 17β - (β - cyclohexylpropionate), 17β-benzoate, 17β-(p-nitrobenzoate), 17β-(phenylacetate), 17β-cinnamate, 17β-(p-chlorophenoxyacetate) or 17β-nicotinate of 17β-hydroxy-5α-androstano[2,3-c]-1,2,5-oxadiazole N-oxide.

I claim:
1. A compound of the formula

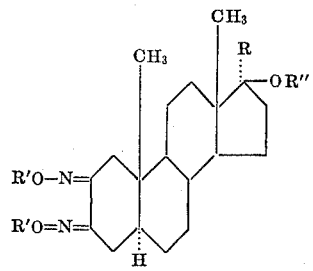

wherein R is hydrogen or lower-alkyl, and R' and R'' are hydrogen or carboxylic acyl having up to twelve carbon atoms.

2. 2,3-dioximido-17α-methyl-5α-androstan-17β-ol.
3. 2,3-dioximido-5α-androstan-17β-ol.
4. 2,3-dioximido-5α-androstan-17β-ol triacetate.
5. A compound of the formula

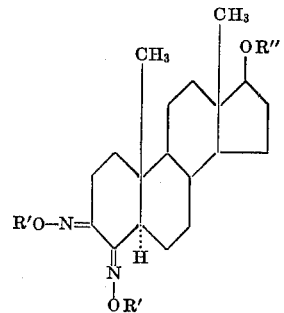

wherein R' and R'' are hydrogen or carboxylic acyl having up to twelve carbon atoms.

6. 3,4-dioximido-5α-androstan-17β-ol.
7. An N-oxide of a compound of the formula

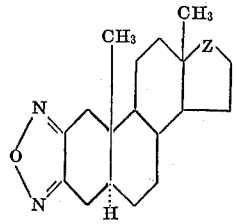

wherein Z is CH(β-OH), C(β-OH)-lower-alkyl, CH(β-OAcyl), C(β-OAcyl)-lower-alkyl or C=O, acyl being carboxylic acyl having up to twelve carbon atoms.

8. 17β - hydroxy - 17α - methyl - 5α - androstano[2,3-c]-1,2,5-oxadiazole N-oxide.

9. 17 - oxo - 5α - androstano[2,3-c] - 1,2,5 - oxadiazole N-oxide.

References Cited

UNITED STATES PATENTS 3,245,988    4/1966    Ohta et al. _____ 260—239.55

OTHER REFERENCES

Boyer, J. H., et al., Journ. Amer. Chem. Soc., 79, 1957, pp. 895–897.

LEWIS GOTTS, *Primary Examiner.*

E. G. LOVE, *Assistant Examiner.*

U.S. Cl. X.R.

260—397.4, 239.5, 397.5; 167—74

UNITED STATES PATENT OFFICE
CERTIFICATE OF CORRECTION

Patent No. 3,415,818                                        December 10, 1968

Robert G. Christiansen

It is certified that error appears in the above identified patent and that said Letters Patent are hereby corrected as shown below:

Column 1, line 56, "p-chlorophenoylacetyl" should read -- p-chlorophenoxyacetyl --. Column 2, lines 10 to 25, the left-hand portion of formula II should appear as shown below:

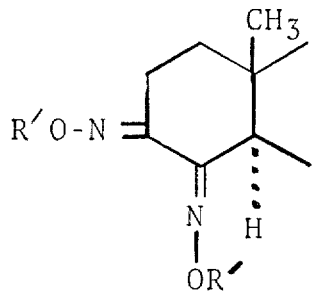

Column 4, line 72, "[1,3-c]" should read -- [2,3-c] --. Column 5, line 22, "androsano" should read -- androstano --; line 51, "or III" should read -- of III --. Column 6, lines 3 to 14, the left-hand portion of the formula should appear as shown below:

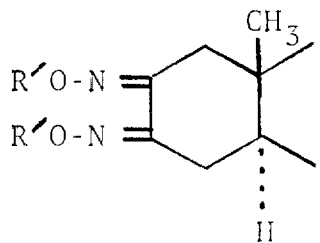

Signed and sealed this 17th day of March 1970.

(SEAL)
Attest:

EDWARD M. FLETCHER, JR.                        WILLIAM E. SCHUYLER, JR.
Attesting Officer                                         Commissioner of Patents